US010486793B2

(12) United States Patent
Dorsett et al.

(10) Patent No.: US 10,486,793 B2
(45) Date of Patent: Nov. 26, 2019

(54) YAW CONTROL IN AN AIRCRAFT

(71) Applicant: Lockheed Martin Corporation, Bethesda, MD (US)

(72) Inventors: Kenneth Merle Dorsett, Aledo, TX (US); Robert Carl Storrie, Willow Park, TX (US)

(73) Assignee: Lockheed Martin Corporation, Bethesda, MD (US)

(*) Notice: Subject to any disclaimer, the term of this patent is extended or adjusted under 35 U.S.C. 154(b) by 1 day.

(21) Appl. No.: 15/166,369

(22) Filed: May 27, 2016

(65) Prior Publication Data
US 2017/0341731 A1 Nov. 30, 2017

(51) Int. Cl.
| | | |
|---|---|---|
| *B64C 9/02* | (2006.01) | |
| *B64C 9/12* | (2006.01) | |
| *B64C 9/34* | (2006.01) | |
| *B64C 5/08* | (2006.01) | |
| *B64C 13/28* | (2006.01) | |
| *B64C 13/30* | (2006.01) | |
| *B64C 5/10* | (2006.01) | |
| *B64C 9/32* | (2006.01) | |

(52) U.S. Cl.
CPC ............ *B64C 9/34* (2013.01); *B64C 5/08* (2013.01); *B64C 5/10* (2013.01); *B64C 9/02* (2013.01); *B64C 9/12* (2013.01); *B64C 9/323* (2013.01); *B64C 13/28* (2013.01); *B64C 13/30* (2013.01); *Y02T 50/44* (2013.01)

(58) Field of Classification Search
CPC ........... B64C 9/32; B64C 9/323; B64C 9/326; B64C 9/34; B64C 9/36; B64C 3/58; B64C 23/065; B64C 23/069; B64C 23/072; B64C 23/076
See application file for complete search history.

(56) References Cited

U.S. PATENT DOCUMENTS 1,280,195 A   10/1918 Eaton
1,545,808 A    6/1925 Ajello
(Continued)

FOREIGN PATENT DOCUMENTS

DE   708447   6/1941
DE   718322   2/1942
(Continued)

OTHER PUBLICATIONS

Collins English Dictionary, "Definition of 'hinge'" 2010. Webster's New World College Dictionary, 4th Edition. Houghton Mifflin Harcourt. (Year: 2010).*
(Continued)

*Primary Examiner* — Richard R. Green
(74) *Attorney, Agent, or Firm* — Baker Botts L.L.P.

(57) ABSTRACT

In one embodiment, an apparatus includes a first deflector configured to couple to a shaft of a wing of an aircraft and form part of a top surface of the wing when in a first closed position, and a second deflector configured to couple to the shaft and form part of a bottom surface of the wing when in a second closed position. The first deflector and the second deflector may be configured to be positioned proximate to the tip of the wing. The first deflector and the second deflector may be configured to simultaneously pivot from the closed positions to respective first and second open positions upon actuation of the shaft.

18 Claims, 4 Drawing Sheets

(56) References Cited

U.S. PATENT DOCUMENTS

| | | | |
|---|---|---|---|
| 1,724,456 A | 8/1929 | Crook | |
| 2,003,223 A * | 5/1935 | Rose | B64C 21/02 |
| | | | 244/204 |
| 2,373,088 A | 4/1945 | Allen | |
| 2,373,089 A | 4/1945 | Allen et al. | |
| 2,433,649 A * | 12/1947 | Clevenger | B64C 9/00 |
| | | | 244/213 |
| 2,557,829 A | 6/1951 | Lavelle | |
| 2,723,091 A | 11/1955 | Davies | |
| 2,852,211 A | 9/1958 | Xenakis | |
| 2,987,277 A | 6/1961 | Richardson et al. | |
| 3,107,882 A | 10/1963 | Matteson et al. | |
| 3,721,406 A | 3/1973 | Hurlbert | |
| 3,774,869 A * | 11/1973 | Harmon | B64C 9/32 |
| | | | 244/221 |
| 4,132,375 A | 1/1979 | Lamar | |
| 4,391,424 A | 7/1983 | Bartoe, Jr. | |
| 4,466,586 A | 8/1984 | Burnham | |
| 4,566,657 A * | 1/1986 | Grow | B64C 9/323 |
| | | | 244/113 |
| 4,739,957 A | 4/1988 | Vess et al. | |
| 5,895,015 A | 4/1999 | Saiz | |
| 6,491,261 B1 | 12/2002 | Blake | |
| 7,780,120 B1 | 8/2010 | Fairchild | |
| 2007/0284483 A1 * | 12/2007 | Milliere | B64C 3/58 |
| | | | 244/217 |
| 2016/0001878 A1 | 1/2016 | Lee | |
| 2016/0137290 A1 | 5/2016 | Emerick | |

FOREIGN PATENT DOCUMENTS

| | | |
|---|---|---|
| DE | 726413 | 10/1942 |
| DE | 737178 | 7/1943 |
| GB | 919793 | 2/1963 |
| GB | 2237254 | 5/1991 |

OTHER PUBLICATIONS

Extended European Search Report; re: Appl. No. 17172520.3-1754; Reference JL89290P.EPP; 11 pages, dated Oct. 13, 2017.

Communication pursuant to Article 94(3) EPC; European Patent Office; Appl. No. 17 172 520.3-1010; Ref. No. JL89290P.EPP; 5 pages.

\* cited by examiner

YAW CONTROL IN AN AIRCRAFT

TECHNICAL FIELD

This disclosure relates in general to aircraft control, and more particularly to yaw control in an aircraft.

BACKGROUND

During flight, a yawing moment may be exerted on an aircraft. The moment may cause a side-to-side movement of the aircraft's nose. This side-to-side movement may be referred to as yaw.

SUMMARY OF THE DISCLOSURE

According to one embodiment, an apparatus includes a first deflector configured to couple to a shaft of a wing of an aircraft and form part of a top surface of the wing when in a first closed position, and a second deflector configured to couple to the shaft and form part of a bottom surface of the wing when in a second closed position. The first deflector and the second deflector may be configured to be positioned proximate to the tip of the wing. The first deflector and the second deflector may be configured to simultaneously pivot from the closed positions to respective first and second open positions upon actuation of the shaft.

The present disclosure may provide numerous advantages. For example, the yaw control device may be positioned proximate to the wingtip such that thicker regions of the wing may be used for fuel storage thereby maximizing the range of an aircraft. As another example, positioning the yaw control device proximate to the wingtip so that the yaw control device is not in front of a trailing edge control device (e.g., an elevon) in the wing may provide a primary load path that may not have to transfer loads through multiple adjacent cutouts in the wing structure. As another example, a smaller actuator load may be used to actuate the deflectors of the yaw control device because the deflectors may be coupled to a common shaft. By coupling the deflectors to a common shaft, the aerodynamic moment about the shaft may be minimized due to opposing forces from the deflectors. Additionally, separate actuators may not be required since one actuator may be used to actuate the common shaft. As another example, the yaw control device may be positioned at a distance from the leading and trailing edges of a wing so that the leading and trailing edges are maintained as continuous edges with no breaks in the edges even when the yaw control device is in an open position, thereby enhancing the aerodynamic performance of the aircraft. As another example, the yaw control device may be positioned at a distance from the wingtip such that the tip of the wing may not open and close with the deflectors. This positioning may allow for continuous leading and trailing edges at the tip of the wing, which may allow for a stiffer wing structure. As another example, the common shaft may be oriented at an aft-swept angle, thereby providing a side force adding to the generation of a yaw moment. Deflectors having an aft-swept common shaft may generate a greater yaw moment for a given surface size than a common shaft oriented normal to a longitudinal axis of the aircraft. As another example, the deflectors of the yaw control device may each have an approximately equal area thereby providing counter-acting hinge moments about the common shaft attached to the deflectors. The counter-acting hinge moments may minimize the total hinge moment that the common control actuator must overcome, thereby allowing for a smaller actuator. As another example, the deflectors may be opened on both left and right wings simultaneously, thereby providing a speed-brake function. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
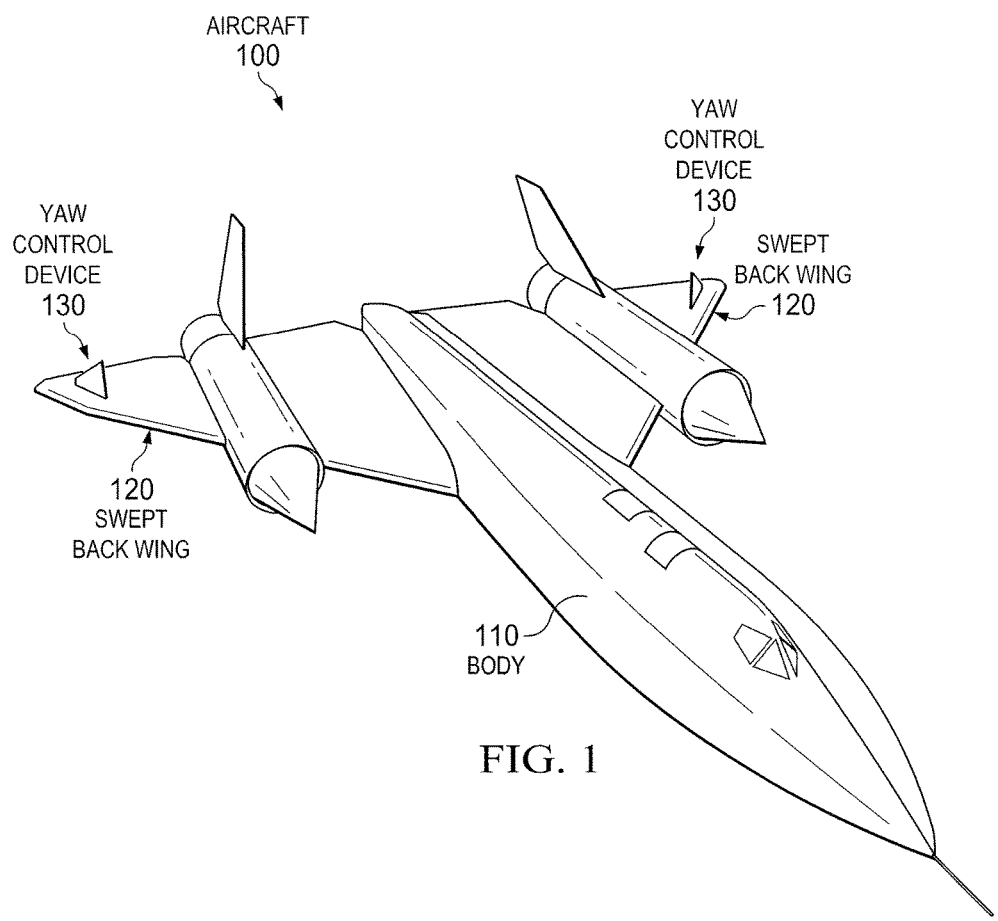
FIG. 1 is a diagram illustrating an aircraft in which an example yaw control device may be used, according to certain embodiments.

An aircraft may rotate about three axes due to forces exerted on the aircraft during flight. These three axes each intersect the aircraft's center of gravity and include the following: a pitch axis, a roll axis, and a yaw axis. The pitch axis is an axis that is perpendicular to the side of the body (e.g., a lateral axis through the aircraft's center of gravity). The roll axis is an axis that is parallel to the body (e.g., a longitudinal axis that runs the length of the body and intersects the aircraft's center of gravity). The yaw axis is an axis that is perpendicular to the top surface of the body (e.g., a vertical axis through the aircraft's center of gravity). An aircraft may include components to control rotation about these axes to provide stability and safety to the aircraft.

Yaw control may allow an aircraft to counteract side forces that are exerted on the aircraft during flight. For example, an aerodynamic force, such as wind, may act on a left side of an aircraft's nose. This aerodynamic force may create a moment about the aircraft's yaw axis that could result in the aircraft rotating clockwise about the yaw axis. Without yaw control to balance the aerodynamic force, the aircraft may rotate uncontrollably.

Accordingly, aspects of the present disclosure include an apparatus that, in one embodiment, includes a first deflector configured to couple to a shaft of a wing of an aircraft and form part of a top surface of the wing when in a first closed position, and a second deflector configured to couple to the shaft and form part of a bottom surface of the wing when in a second closed position. The first deflector and the second deflector may be configured to be positioned proximate to the tip of the wing. The first deflector and the second deflector may be configured to simultaneously pivot from the closed positions to respective first and second open positions upon actuation of the shaft.

The present disclosure may provide numerous advantages. For example, the yaw control device may be positioned proximate to the wingtip such that thicker regions of the wing may be used for fuel storage thereby maximizing the range of an aircraft. As another example, positioning the yaw control device proximate to the wingtip so that the yaw control device is not in front of a trailing edge control device (e.g., an elevon) in the wing may provide a primary load path that may not have to transfer loads through multiple adjacent cutouts in the wing structure. As another example, a smaller actuator load may be used to actuate the deflectors of the yaw control device because the deflectors may be coupled to a common shaft. By coupling the deflectors to a common shaft, the aerodynamic moment about the shaft may be minimized due to opposing forces from the deflectors. Additionally, separate actuators may not be required since one actuator may be used to actuate the common shaft. As another example, the yaw control device may be positioned at a distance from the leading and trailing edges of a wing so that the leading and trailing edges are maintained as continuous edges with no breaks in the edges even when the yaw control device is in an open position, thereby enhancing the aerodynamic performance of the aircraft. As another example, the yaw control device may be positioned at a distance from the wingtip such that the tip of the wing may not open and close with the deflectors. This positioning may allow for continuous leading and trailing edges at the tip of the wing, which may allow for a stiffer wing structure. As another example, the common shaft may be oriented at an aft-swept angle, thereby providing a side force adding to the generation of a yaw moment. Deflectors having an aft-swept common shaft may generate a greater yaw moment for a given surface size than a common shaft oriented normal to a longitudinal axis of the aircraft. As another example, the deflectors of the yaw control device may each have an approximately equal area thereby providing counter-acting hinge moments about the common shaft attached to the deflectors. The counter-acting hinge moments may minimize the total hinge moment that the common control actuator must overcome, thereby allowing for a smaller actuator. As another example, the deflectors may be opened on both left and right wings simultaneously, thereby providing a speed-brake function. Other technical advantages will be readily apparent to one skilled in the art from the following figures, descriptions, and claims. Moreover, while specific advantages have been enumerated above, various embodiments may include all, some, or none of the enumerated advantages.

Figure 2:
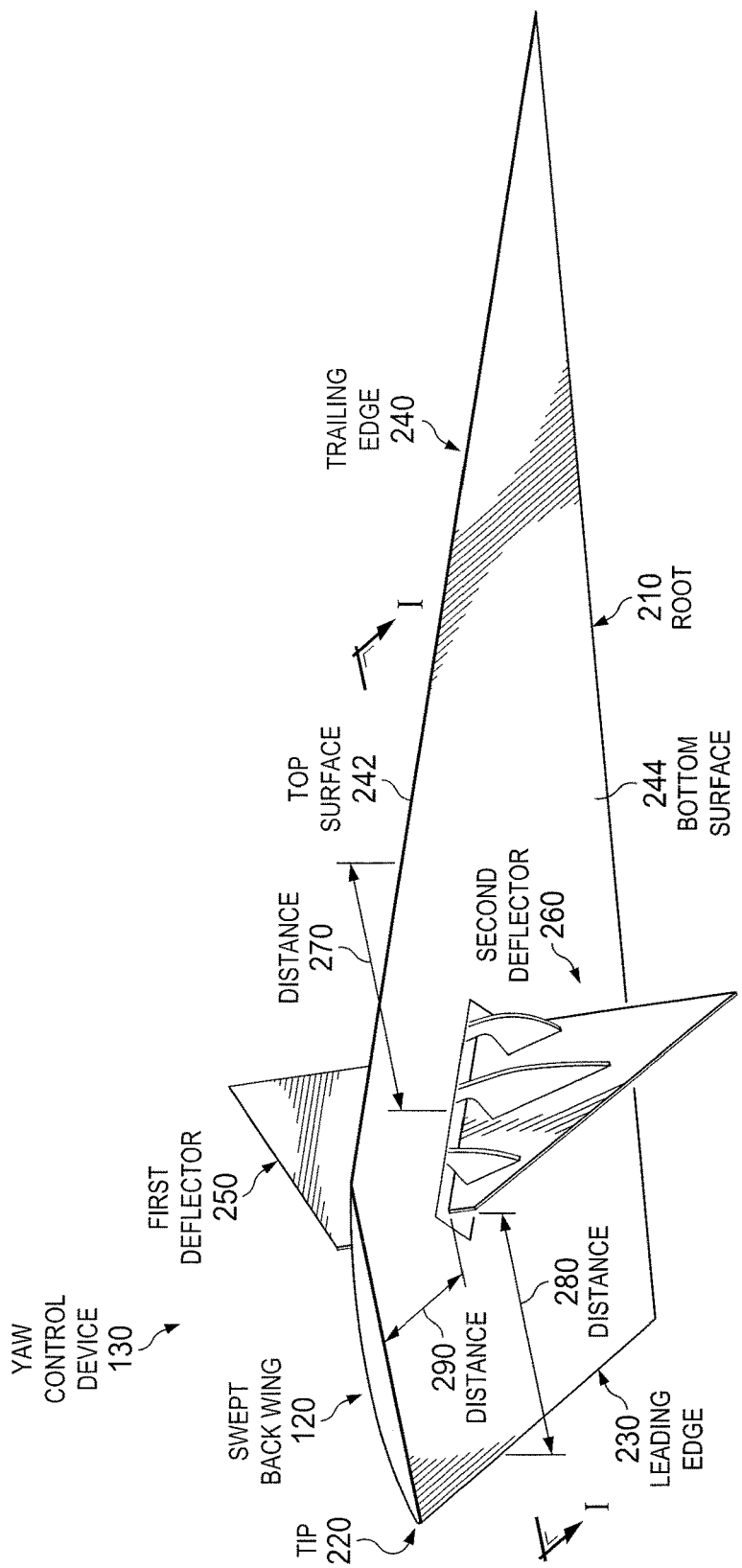
FIG. 2 is a bottom perspective view illustrating an example of a swept back wing with the yaw control device of FIG. 1, according to certain embodiments.
Figure 3A:
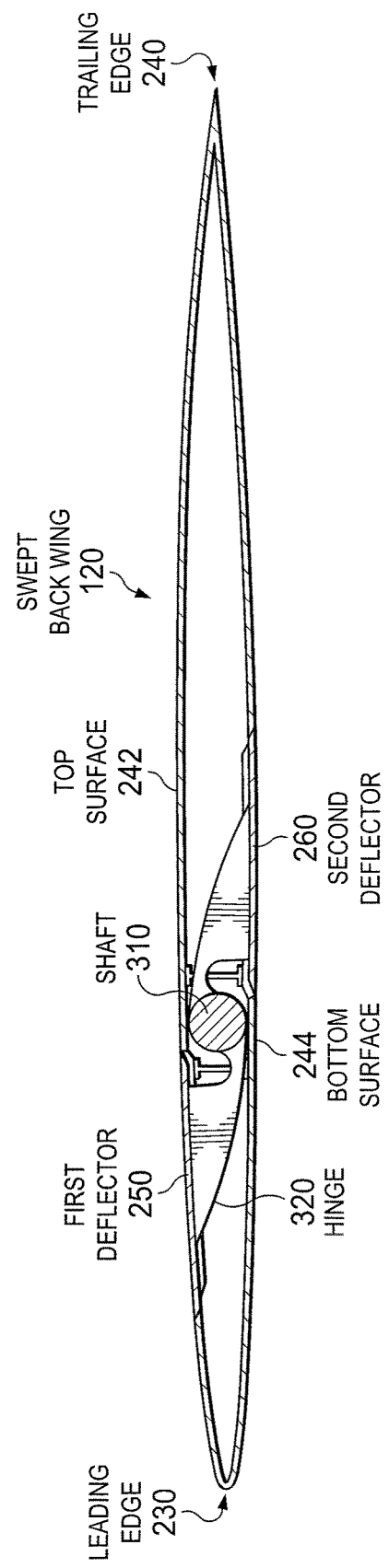
FIG. 3A is a section view illustrating an example of the swept back wing with the yaw control device of FIG. 2 in a closed position, according to certain embodiments.
Figure 3B:
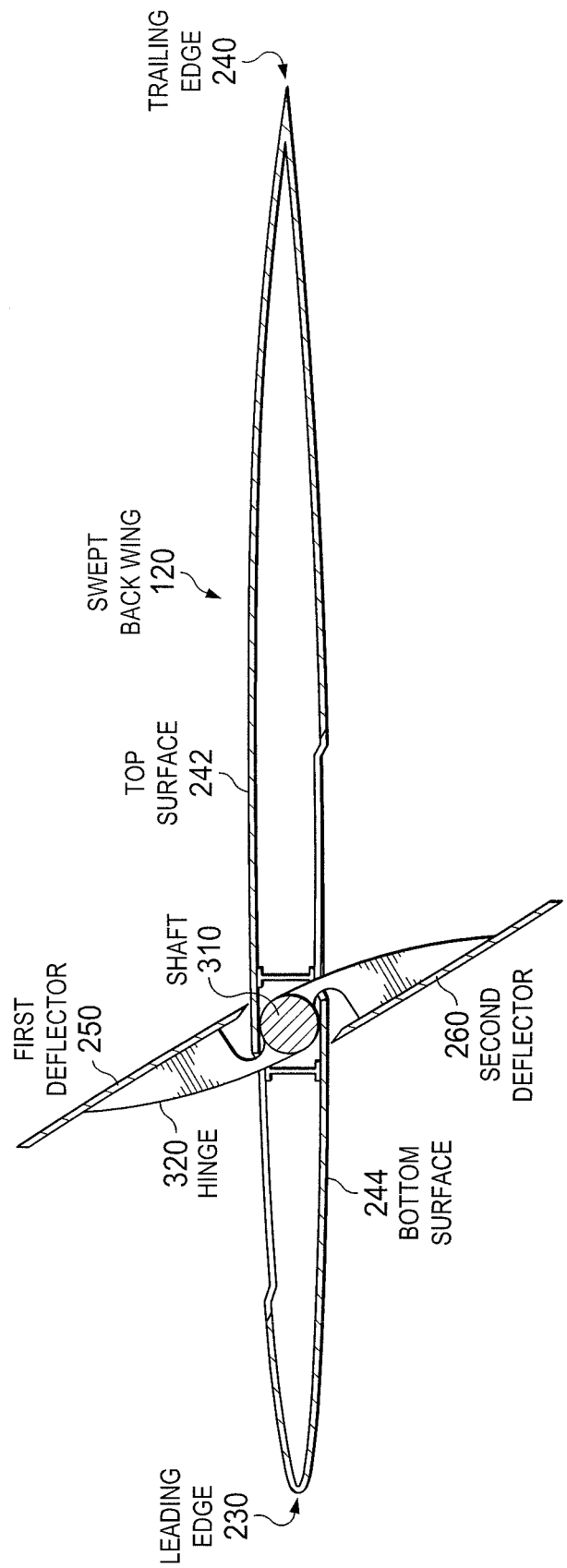
FIG. 3B is a section view illustrating an example of the swept back wing with the yaw control device of FIG. 2 in an open position, according to certain embodiments.

Additional details are discussed in FIGS. 1 through 3. FIG. 1 illustrates aircraft 100 in which an example yaw control device 130 may be used, and FIG. 2 shows an example swept back wing 120 with yaw control device 130 of FIG. 1. FIGS. 3A and 3B illustrate a section view of swept back wing 120 and yaw control device 130 of FIG. 2 in a closed and open position.

FIG. 1 is a diagram illustrating an aircraft 100 in which an example yaw control device 130 may be used, according to certain embodiments. Aircraft 100 may be any type of airborne vehicle in an embodiment. For example, aircraft 100 may be a tailless aircraft. Tailless aircraft may not have a vertical fin and/or a horizontal stabilizing structure in the aircraft's tail section in some embodiments. As another example, aircraft 100 may be an aircraft with a tail. Aircraft 100 may include a body 110, a swept back wing 120 and a yaw control device 130 in certain embodiments.

Body 110 may be a structural component of aircraft 100 in an embodiment. For example, body 110 may be a fuselage. As another example, body 110 may be the main structural component of aircraft with a "flying wing" configuration. Body 110 may be any shape. For example, body 110 may be a long hollow cylindrical tube. As another example, body 110 may have a slender shape to reduce drag, such as in a fighter plane. Body 110 may be coupled to swept back wing 120 in certain embodiments.

Swept back wing 120 may be a wing that angles rearward from root 210 in an embodiment. For example, swept back wing 120 may be angled rearward in a direction from the nose of aircraft 100 towards the rear of aircraft 100 rather than at an angle perpendicular to body 110. Swept back wing 120 may have various sweep angles that can be measured by comparing a line from leading edge 230 to tip 220 to a perpendicular of a longitudinal axis of body 110 (such as the pitch axis). For example, swept back wing 120 may have a sweep angle of twenty-five degrees. As another example, swept back wing 120 may have a sweep angle of forty-five degrees. Swept back wing 120 may be coupled to body 110 at root 210 in certain embodiments. Swept back wing 120 may provide a technical advantage of delaying shockwaves and aerodynamic drag of aircraft 100. Swept back wing 120 may include a yaw control device 130 in certain embodiments. In some embodiments, the wing may have no sweep, or may be swept forward.

Yaw control device 130 may be a device that includes first deflector 250 and second deflector 260 (described below) configured to provide yaw control in aircraft 100 in certain embodiments. As noted above, aerodynamic forces may be exerted on aircraft 100, which may cause aircraft 100 to rotate about its yaw axis. To counteract these aerodynamic forces and balance aircraft 100, yaw control device 130 may be actuated such that yaw control device 130 pivots to an open position. One or more yaw control devices 130 may be positioned on each swept back wing 120. For example, each swept back wing 120 may have two yaw control devices 130. In that example, each yaw control device 130 may have two deflectors that are actuated by separate shafts. Yaw control device 130 may be positioned proximate to tip 220 of swept back wing 120 in certain embodiments.

FIG. 2 is a bottom perspective view illustrating an example of swept back wing 120 with yaw control device 130 of FIG. 1, according to certain embodiments. Swept back wing 120 may include a root 210, a tip 220, a leading edge 230, a trailing edge 240, a first deflector 250, a second deflector 260, and distances 270, 280, and 290 in certain embodiments.

Root 210 may be a portion of swept back wing 120 that is attached to body 110 in an embodiment. In some embodiments, root 210 may represent the centerline of aircraft 100, such as in a "flying wing" configuration. Root 210 may be located proximal to body 110 and distal to tip 220 in an embodiment. Root 210 may run parallel to body 110 in certain embodiments. Root 210 may be positioned opposite to tip 220 in certain embodiments.

Tip 220 of swept back wing 120 may be a portion of swept back wing 120 that forms the outermost edge of swept back wing 120 with respect to body 110. Tip 220 may be distal to body 110 in an embodiment. Tip 220 may be positioned opposite to root 210 in certain embodiments. Tip 220 may have a continuous edge in an embodiment. For example, when first deflector 250 and second deflector 260 are positioned in an open position, an edge of tip 220 may not have a break in its structure. In certain embodiments, tip 220 remains in a fixed position and does not actuate or pivot with first deflector 250 and second deflector 260. A continuous edge at tip 220 may provide improved structural stiffness and structural load paths. In addition, a continuous edge at tip 220 may provide improved aerodynamic efficiency due to the lack of gaps or edges in tip 220 associated with other tip-mounted control surfaces.

Leading edge 230 may be the foremost edge of swept back wing 120 in an embodiment. Leading edge 230 may be a continuous edge in certain embodiments. For example, when first deflector 250 and second deflector 260 are positioned in an open position, leading edge 230 may be a single edge without any breaks in its structure. In certain embodiments, leading edge 230 remains in a fixed position and does not actuate or pivot with first deflector 250 and second deflector 260. A continuous edge along leading edge 230 may provide improved aerodynamic efficiency due to the lack of gaps or edges in leading edge 230.

Trailing edge 240 may be the rear edge of swept back wing 120 in an embodiment. Trailing edge 240 may be opposed to leading edge 230 in an embodiment. Trailing edge 240 may be a continuous edge in certain embodiments. For example, when first deflector 250 and second deflector 260 are positioned in an open position, trailing edge 240 may be a single edge without any breaks in its structure. In certain embodiments, trailing edge 240 remains in a fixed position and does not actuate or pivot with first deflector 250 and second deflector 260. A continuous edge along trailing edge 240 may provide improved aerodynamic efficiency due to the lack of gaps or edges in trailing edge 240.

Top surface 242 may be a surface of swept back wing 120 that is the top-most surface of swept back wing 120 in an embodiment. Top surface 242 may also be a surface from which first deflector 250 extends when actuated to an open position. Top surface 242 may be opposed to bottom surface 244 in an embodiment.

Bottom surface 244 may be a surface of swept back wing 120 that is the bottom-most surface of swept beck wing 120 in an embodiment. Bottom surface 244 may also be a surface from which second deflector 260 extends when actuated to an open position in an embodiment. Bottom surface 244 may be opposed to top surface 242 in an embodiment.

First deflector 250 may be a panel of swept back wing 120 that provides yaw control for aircraft 100 in an embodiment. First deflector 250 may be located proximate to tip 220 in an embodiment. For example, first deflector 250 may be positioned at distance 290 from tip 220. In that example, first deflector 250 may be positioned closer to tip 220 than to root 210. First deflector 250 may be positioned at distance 290 from tip 220 such that tip 220 does not actuate with first deflector 250. First deflector 250 may be positioned distal to root 210 and body 110 in an embodiment. By positioning first deflector 250 proximate to tip 220, first deflector 250 may provide the ability for tip 220 to be a continuous closed structure that may have advantages of stiffness, lighter weight and improved aerodynamics. First deflector 250 may be attached to shaft 310 (discussed below in reference to FIG. 3A) in certain embodiments. For example, first deflector 250 may be attached to shaft 310 using hinge 320. First deflector 250 may be actuated by shaft 310 in an embodiment. For example, first deflector 250 may be actuated by pilot control or automatically. First deflector 250 may be approximately the same size as second deflector 260 in an embodiment. For example, first deflector 250 and second deflector 260 may have the same length and width. As another example, first deflector 250 and second deflector 260 may have the same area. The surface area of first deflector 250 may be adjusted as needed to provide the best balance between control authority and minimizing actuator hinge moment. First deflector 250 may be any shape in an embodiment. First deflector 250 may be made of any material, such as a metal or a composite. First deflector 250 may form part of top surface 242 when positioned in a closed position. First deflector 250 may pivot upward from top surface 242 when shaft 310 is actuated. By pivoting upward from top surface 242, first deflector 250 may provide yaw control to aircraft 100 when pivoted on a single side of aircraft 100. When first deflector 250 is pivoted on both sides of aircraft 100, first deflector 250 may act as an air brake.

Second deflector 260 may be a panel of swept back wing 120 that provides yaw control for aircraft 100 in an embodiment. Second deflector 260 may be located proximate to tip 220 in an embodiment. For example, second deflector 260 may be positioned at distance 290 from tip 220. In that example, second deflector 260 may be positioned closer to tip 220 than to root 210. Second deflector 260 may be positioned at distance 290 from tip 220 such that tip 220 does not actuate with second deflector 260. Second deflector 260 may be positioned distal to root 210 and body 110 in an embodiment. By positioning second deflector 260 proximate to tip 220, second deflector 260 may provide the ability for tip 220 to be a continuous closed structure that may have advantages of stiffness, lighter weight, and improved aerodynamics. Second deflector 260 may be attached to shaft 310 in certain embodiments. For example, second deflector 260 may be attached to shaft 310 using hinge 320. Second deflector 260 may be actuated by shaft 310 in an embodiment. For example, second deflector 260 may be actuated by pilot control or automatically. Second deflector 260 may be approximately the same size as first deflector 250 in an embodiment. For example, first deflector 250 and second deflector 260 may have the same length and width. As another example, first deflector 250 and second deflector 260 may have the same area. The surface area of second deflector 260 may be adjusted as needed to provide the best balance between control authority and minimizing actuator hinge moment. Second deflector 260 may be any shape in an embodiment. Second deflector 260 may be made of any material, such as a metal or a composite. Second deflector 260 may form part of bottom surface 244 when positioned in a closed position. Second deflector 260 may pivot downward from bottom surface 244 when shaft 310 is actuated. By pivoting downward from bottom surface 244, second deflector 260 may provide yaw control to aircraft 100 when pivoted on a single side of aircraft 100. When second deflector 260 is pivoted on both sides of aircraft 100, second deflector 260 may act as an air brake.

Distance 270 may be a non-zero distance from trailing edge 240 to first deflector 250 and second deflector 260 in an embodiment. Distance 270 may allow trailing edge 240 to be maintained as a continuous edge when first deflector 250 and second deflector 260 are positioned in an open position.

Distance 280 may be a non-zero distance from leading edge 230 to first deflector 250 and second deflector 260 in an embodiment. Distance 280 may allow leading edge 230 to be maintained as a continuous edge when first deflector 250 and second deflector 260 are positioned in an open position.

Distance 290 is a non-zero distance from tip 220 to first deflector 250 and second deflector 260 in an embodiment. Distance 290 may allow tip 220 to be maintained as a continuous edge even when first deflector 250 and second deflector 260 are positioned in an open position. Distance 290 may be a distance such that first deflector 250 and second deflector 260 are positioned proximate to tip 220 and distal to root 210.

FIG. 3A is a section view illustrating an example of swept back wing 120 with yaw control device 130 of FIG. 2 in a closed position, according to certain embodiments. FIG. 3B is a section view illustrating an example of swept back wing 120 with yaw control device 130 of FIG. 2 in an open position, according to certain embodiments. These figures will be discussed together below. Generally, in operation, yaw control device 130 may be actuated from a closed position, as illustrated in FIG. 3A, to an open position, as illustrated in FIG. 3B, to provide yaw control to aircraft 100. As shown in the section view taken along section I-I of FIG. 2, swept back wing 120 may include a shaft 310 and a hinge 320 in an embodiment.

Shaft 310 may be any type of shaft configured to couple to first deflector 250 and second deflector 260 in certain embodiments. Shaft 310 may couple to first deflector 250 and second deflector 260 in any manner. For example, shaft 310 may couple to first deflector 250 and second deflector 260 using hinge 320. Shaft 310 may be positioned at a swept back angle in certain embodiments. For example, shaft 310 may be positioned at a swept back angle parallel to swept back wing 120. Shaft 310 may be positioned proximate to leading edge 230 in certain embodiments. Shaft 310 may be positioned distal to trailing edge 240 in certain embodiments. Shaft 310 may be configured to simultaneously actuate first deflector 250 and second deflector 260 in an embodiment.

Hinge 320 may be any type of hinge configured to couple first deflector 250 and second deflector 260 to shaft 310 in an embodiment. For example, hinge 320 may be a gooseneck hinge. As another example, hinge 320 may be a gooseneck hinge connected to push rod linkages. As another example, hinge 320 may be arranged in a butterfly valve style of arrangement.

As an example embodiment of operation, one embodiment may include aircraft 100 with body 110 and swept back wing 120. Swept back wing 120 may include yaw control device 130 with first deflector 250 and second deflector 260 each coupled to shaft 310 and positioned proximate to tip 220 of swept back wing 120. First deflector 250 and second deflector 260 may initially be in a closed position, as illustrated in FIG. 3A. As aerodynamic forces act upon a side of aircraft 100, the forces may cause a moment about the yaw axis of aircraft 100. To counteract the yaw moment, shaft 310 may actuate first deflector 250 and second deflector 260 to an open position, as illustrated in FIG. 3B. For example, first deflector 250 may be actuated upward from top surface 242 and second deflector 260 may be actuated downward from bottom surface 244. By actuating first deflector 250 and second deflector 260 to an open position, first deflector 250 and second deflector 260 may counteract the yaw moment exerted on aircraft 100. As first deflector 250 and second deflector 260 are opened, a yaw moment may be introduced via a drag force acting through a moment arm relative to the center of gravity of aircraft 100 such that first deflector 250 and second deflector 260 provide yaw control to aircraft 100.

The present disclosure may provide numerous advantages. For example, yaw control device 130 may be positioned proximate to tip 220 such that thicker regions of swept back wing 120 may be used for fuel storage thereby maximizing the range of aircraft 100. As another example, positioning yaw control device 130 proximate to tip 220 so that yaw control device 130 is not in front of a trailing edge control device (e.g., an elevon) in swept back wing 120 may provide a primary load path that may not have to transfer loads through multiple adjacent cutouts in the wing structure. As another example, a smaller actuator load may be used to actuate the deflectors of yaw control device 130 because the deflectors may be coupled to a common shaft 310. By coupling first deflector 250 and second deflector 260 to a common shaft 310, the aerodynamic moment about shaft 310 may be minimized due to opposing forces from the deflectors. Additionally, separate actuators may not be required since one actuator may be used to actuate the common shaft 310. As another example, yaw control device 130 may be positioned at a distance from the leading and trailing edges of swept back wing 120 so that leading edge 230 and trailing edge 240 are maintained as continuous edges with no breaks in the edges even when yaw control device 130 is in an open position, thereby enhancing the aerodynamic performance of aircraft 100. As another example, yaw control device 130 may be positioned at distance 290 from tip 220 such that tip 220 of swept back wing 120 may not open and close with the deflectors. This positioning may allow for a continuous leading edge 230 and trailing edge 240 at tip 220 of swept back wing 120, which may allow for a stiffer wing structure. As another example, the common shaft 310 may be oriented at an aft-swept angle, thereby providing a side force adding to the generation of a yaw moment. Deflectors having an aft-swept common shaft 310 may generate a greater yaw moment for a given surface size than a common shaft oriented normal to a longitudinal axis of aircraft 100. As another example, first deflector 250 and second deflector 260 of yaw control device 130 may each have an approximately equal area, thereby providing counter-acting hinge moments about the common shaft 310 attached to first deflector 250 and second deflector 260. The counter-acting hinge moments may minimize the total hinge moment that the common control actuator must overcome, thereby allowing for a smaller actuator. As another example, first deflector 250 and second deflector 260 may be opened on both left and right swept back wings 120 simultaneously, thereby providing a speed-brake function. Other technical advantages will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. A tailless aircraft, comprising:
   a fuselage;
   a swept back wing coupled to the fuselage, the wing comprising:
      a leading edge;
      a top surface;
      a bottom surface;
      a root proximate to the fuselage; and
      a tip opposed to the root;
   a shaft positioned in the wing at a swept back angle parallel to the leading edge of the swept back wing; and
   a yaw control device coupled to the shaft and positioned proximate to the tip of the wing, the yaw control device comprising:
      a first deflector forming a portion of the top surface of the wing when configured in a closed position;

a second deflector forming a portion of the bottom surface of the wing when configured in a closed position;

a hinge connected to the first deflector, the second deflector, and the shaft, the hinge coupling the first deflector to the shaft and the second deflector to the shaft;

wherein the first deflector and the second deflector are configured to simultaneously pivot from the closed position to an open position upon actuation of the shaft such that the hinge causes the first deflector to pivot about an axis of rotation through a center of the shaft upwards from the top surface and the hinge causes the second deflector to pivot about an axis of rotation through a center of the shaft downwards from the bottom surface;

wherein the yaw control device is positioned a distance from the tip such that the tip cannot open and close with the first and second deflectors; and wherein the yaw control device is positioned at a distance from a leading edge of the wing and at a distance from a trailing edge of the wing so that the leading edge and the trailing edge are maintained as continuous edges with no breaks when the first and second deflectors are in respective first and second open positions.

2. An aircraft, comprising:
a fuselage;
a swept back wing coupled to the fuselage and comprising a top surface, a bottom surface opposed to the top surface, a root proximate to the fuselage, a tip distal to the fuselage, and a leading edge;
a shaft positioned in the wing at a swept back angle parallel to the leading edge of the swept back wing; and
a yaw control device positioned proximate to the tip of the wing, the yaw control device comprising:
 a first deflector configured to couple to the shaft and forming part of the top surface of the wing when in a first closed position;
 a second deflector configured to couple to the shaft and forming part of the bottom surface of the wing when in a second closed position; and
 a hinge connected to the first deflector, the second deflector, and the shaft, the hinge coupling the first deflector to the shaft and the second deflector to the shaft;
wherein the first deflector and the second deflector are configured to simultaneously pivot about an axis of rotation through a center of the shaft from the closed positions to respective first and second open positions;
wherein the yaw control device is positioned a first distance from the tip such that the tip cannot open and close with the first and second deflectors; and
wherein the yaw control device is positioned at a distance from a leading edge of the wing and at a distance from a trailing edge of the wing so that the leading edge and the trailing edge are maintained as continuous edges with no breaks when the first and second deflectors are in respective first and second open positions.

3. The aircraft of claim 2, wherein a length of the first deflector is approximately equal to a length of the second deflector.

4. The aircraft of claim 2, wherein the yaw control device is positioned at a distance from the tip of the wing.

5. The aircraft of claim 2, wherein the aircraft comprises a tailless aircraft.

6. The aircraft of claim 2, wherein the hinge comprises a gooseneck hinge.

7. The aircraft of claim 2, wherein the wing comprises a leading edge and a trailing edge, and the first deflector is positioned away from the leading edge such that the leading edge comprises a first continuous edge when the first deflector is in the first open position and the second deflector is positioned away from the trailing edge such that the trailing edge comprises a second continuous edge when the second deflector is in the second open position.

8. The aircraft of claim 2, further comprising a second yaw control device positioned proximate to the tip of the wing and at a distance from the yaw control device, wherein the second yaw control device comprises a third deflector and a fourth deflector.

9. The aircraft of claim 2, wherein the first deflector and the second deflector comprise one of:
 a metallic material; or
 a composite material.

10. The aircraft of claim 2, wherein the first deflector pivots upwards from the top surface of the wing and the second deflector pivots downwards from the bottom surface of the wing.

11. An apparatus comprising:
 a first deflector configured to couple to a shaft of a wing of an aircraft and form part of a top surface of the wing when in a first closed position;
 a second deflector configured to couple to the shaft and form part of a bottom surface of the wing when in a second closed position;
 a hinge connected to the first deflector, the second deflector, and the shaft, the hinge coupling the first deflector to the shaft and the second deflector to the shaft;
wherein the first deflector and the second deflector are configured to be positioned proximate to the tip of the wing;
wherein the first deflector and the second deflector are configured to simultaneously pivot about an axis of rotation through a center of the shaft from the closed positions to respective first and second open positions upon actuation of the shaft;
wherein the yaw control device is positioned a distance from the tip such that the tip cannot open and close with the first and second deflectors;
wherein the yaw control device is positioned at a distance from a leading edge of the wing and at a distance from a trailing edge of the wing so that the leading edge and the trailing edge are maintained as continuous edges with no breaks when the first and second deflectors are in respective first and second open positions; and
wherein the shaft is positioned in the wing at a swept back angle parallel to the leading edge of the swept back wing.

12. The apparatus of claim 11, wherein a length of the first deflector is approximately equal to a length of the second deflector.

13. The apparatus of claim 11, wherein the first deflector and the second deflector are each configured to be positioned at a distance from the tip of the wing.

14. The apparatus of claim 11, wherein the aircraft comprises a tailless aircraft.

15. The apparatus of claim 11, wherein the hinge comprises a gooseneck hinge.

16. The apparatus of claim 11, wherein the wing comprises a leading edge and a trailing edge, and the first deflector is configured to be positioned away from the leading edge such that the leading edge comprises a first continuous edge when the first deflector is in the first open position and the second deflector is configured to be positioned away from the trailing edge such that the trailing edge comprises a second continuous edge when the second deflector is in the second open position.

17. The apparatus of claim 11, wherein the first deflector and the second deflector comprise one of:
   a metallic material; or
   a composite material.

18. The apparatus of claim 11, wherein the first deflector is configured to pivot upwards from the top surface of the wing and the second deflector is configured to pivot downwards from the bottom surface of the wing.

* * * * *